US012086082B2

(12) United States Patent
Marolia et al.

(10) Patent No.: US 12,086,082 B2
(45) Date of Patent: Sep. 10, 2024

(54) PASID BASED ROUTING EXTENSION FOR SCALABLE IOV SYSTEMS

(71) Applicant: Intel Corporation, Santa Clara, CA (US)

(72) Inventors: Pratik Marolia, Hillsboro, OR (US); Sanjay Kumar, Hillsboro, OR (US); Rajesh Sankaran, Portland, OR (US); Utkarsh Y. Kakaiya, Folson, CA (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 17/026,516

(22) Filed: Sep. 21, 2020

(65) Prior Publication Data

US 2021/0004338 A1  Jan. 7, 2021

(51) Int. Cl.
   *G06F 13/20*     (2006.01)
   *G06F 3/06*      (2006.01)
   *G06F 9/455*     (2018.01)

(52) U.S. Cl.
   CPC .............. *G06F 13/20* (2013.01); *G06F 3/061* (2013.01); *G06F 3/0655* (2013.01); *G06F 3/0662* (2013.01); *G06F 3/0679* (2013.01); *G06F 9/45558* (2013.01)

(58) Field of Classification Search
   CPC ...... G06F 3/061; G06F 3/0655; G06F 3/0662; G06F 3/0679; G06F 13/20; G06F 9/45558
   See application file for complete search history.

(56) References Cited

U.S. PATENT DOCUMENTS

| 2019/0042463 A1 | 2/2019 | Shanbhogue et al. |
| 2019/0114283 A1* | 4/2019 | Deval ............... G06F 9/4856 |
| 2020/0278935 A1 | 9/2020 | Borikar et al. |
| 2021/0004338 A1 | 1/2021 | Marolia et al. |

FOREIGN PATENT DOCUMENTS

| JP | 2020503593 A | 1/2020 |
| KR | 20120044370 A | 5/2012 |
| KR | 20140028137 A | 3/2014 |

OTHER PUBLICATIONS

International Search Report and Written Opinion for PCT Patent Application No. PCT/US21/45355, Mailed Nov. 24, 2021, 11 pages.

* cited by examiner

*Primary Examiner* — Ernest Unelus
(74) *Attorney, Agent, or Firm* — Compass IP Law PC

(57) ABSTRACT

Methods and apparatus for PASID-based routing extension for Scalable IOV systems. The system may include a Central Processing Unit (CPU) operatively coupled to a scalable Input/Output Virtualization (IOV) device via an in-line device such as a smart controller or accelerator. A Control Process Address Space Identifier (C-PASID) associated with a first memory space is implemented in an Assignable Device Interface (ADI) for the IOV device. The ADI also implements a Data PASID (D-PASID) associated with a second memory space in which data are stored. The C-PASID is used to fetch a descriptor in the first memory space and the D-PASID is employed to fetch data in the second memory space. A hub embedded on the in-line device or implemented as a discrete device is used to steer memory access requests and/or fetches to the CPU or to the in-line device using the C-PASID and D-PASID. IOV devices include multi-PASID helper devices and off-the-shelf devices such as NICs with modified ADIs to support C-PASID and D-PASID usage.

21 Claims, 9 Drawing Sheets

PASID BASED ROUTING EXTENSION FOR SCALABLE IOV SYSTEMS

BACKGROUND INFORMATION

Scalable Input/Output Virtualization (IOV) defines the concept of ADI (Assignable Device Interface) in Scalable IOV devices. These ADIs can be assigned to a Virtual Machine (VM) as part of a virtual device (VDEV or Vdev) emulation. The VDEV emulation is done using a Virtual Device Composition Module (VDCM) in the Virtual Machine Monitor (VMM) software or in a hardware component such as a smart embedded controller (some Cloud Service Providers also use Smart NICs (Network Interface Controllers) to emulate VDEVs for the VMs). Typically, the VM's slow-path IO operations (control and configurations) are intercepted and emulated by the VDCM and fast path operations (e.g., work submission) are submitted directly to the device. The ADIs are configured with a single PASID (Process Address Space ID) to access the VM's memory directly. DMA (Direct Memory Access) requests from the ADI are tagged with the PASID, which is used by the IOMMU (IO Memory Management Unit) to identify the VM's address space and perform DMA remapping. Using a single PASID per ADI for all memory requests could introduce performance overheads for some evolving IO usages, such as in-line smart controller and accelerator IO usages described below.

An in-line smart controller emulates a personality of an IO device to the host and is typically backed by one or more standard off the shelf IO devices (like NICs, SSDs (Solid-State Drives etc.). The IO devices are connected "directly" to the smart controller either integrated on-chip, on-package or connected via an external link to a discrete IO device. In these cases, the IO devices are not visible to the host, and all traffic from IO device flows through the smart controller, hence they are called in-line smart controllers and the IO devices behind it are called helper devices. The helper device fetches descriptors prepared by the smart controller (in the smart controller's memory), but fetch data directly from guest VM memory. A scalable IOV helper device with a single PASID per ADI cannot distinguish between the two address spaces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5d is a schematic diagram illustrating a data fetch using the embodiment of FIG. 5a;

DETAILED DESCRIPTION

Figure 1:
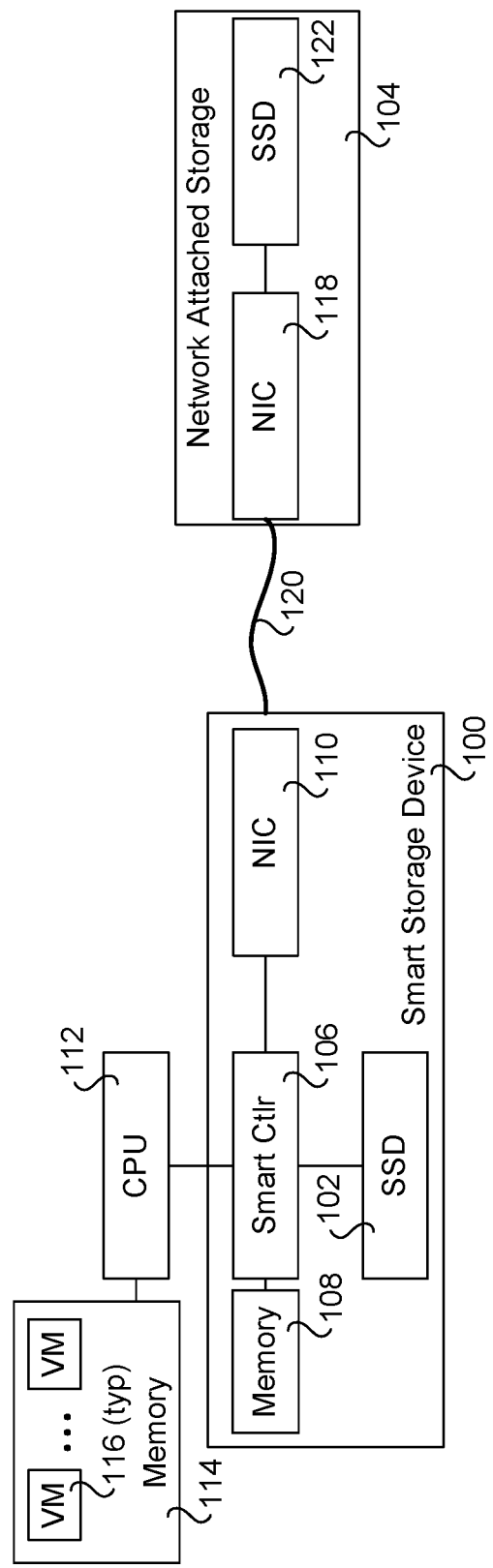
FIG. 1 is a schematic diagram illustrating an example of a smart storage device with two helper devices comprising a local SSD and a network attached storage device.

Embodiments of methods and apparatus for PASID-based routing extension for Scalable IOV systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, "multi-PASID" scalable IOV devices are provided that use two or more PASIDs. In one embodiment, a first PASID is used for descriptor fetches and second for data fetches. Further, to optimize performance, a "hub" is provided in some embodiments that can steer the traffic based on the PASID, to either host memory or memory associated with an intermediate device such as a smart controller memory, Graphics Processing Unit (GPU) memory or an accelerator memory.

Smart Controllers

Smart controllers emulate an IO device personality to the VM, while on the back end it typically uses standard off-the-shelf scalable IOV devices such as a NIC or SSDs. In some embodiments, the IOV devices are enumerated and managed completely by the smart controller and are not visible to the VM. As used herein these IOV devices are called helper devices.

FIG. 1 shows an example of a smart storage device 100 with two helper devices comprising a local SSD 102 and a network attached storage device 104. Smart storage device 100 includes a smart controller 106 coupled to local memory 108, a NIC 110, and SSD 102. Smart controller 106 is also coupled to a CPU 112 connected to host memory 114 in which host software such as guest VMs 116 or containers (not shown) are executed. NIC 110 is coupled to a NIC 118 in network attached storage device 104 via a link 120. NIC 118 is coupled to an SSD 122.

In one aspect, the smart controller provides Cloud Service Provider (CSP) specific value-added services transparent to the host software running on CPU 112. Under a basic workflow, work submission operations submitted by guest VMs or containers are intercepted by smart controller 106. Smart controller 106 processes these descriptors from the guest VM's or container's memory and creates a new set of descriptors for the helper devices in the smart controller's local memory 108.

A scalable IOV device with a single PASID per ADI can only operate in a single address space. This means for a single PASID device to work as a helper to a smart controller, the smart controller would not only have to create a new descriptor in local memory, but also copy data from the guest VM's memory to the smart controller's local memory. This incurs an extra copy for all data path operations, and will add significant tax on bandwidth and capacity of the smart controller's local memory.

Figure 2A:
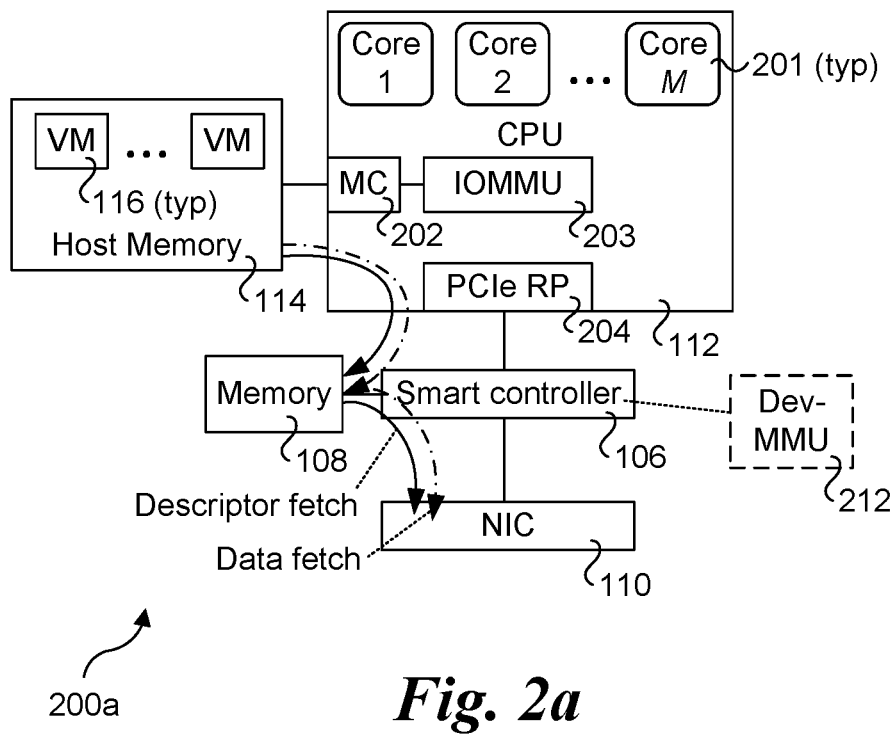
FIG. 2a is a schematic diagram illustrating a conventional memory access scheme for a system including a smart controller.

This problem is illustrated in a system 200a in FIG. 2a, where NIC 110 is implemented as a scalable IOV device. CPU 112 is shown to further include M cores 201, a memory controller (MC) 202, an IOMMU 203 and a PCIe (Peripheral Component Interconnect Express) Root Port (RP) 204. A fundamental aspect of IOV devices is the support for DMA data transfers, which under PCIe comprise PCIe transactions. DMA data transfers (themselves) do not involve execution of software on the CPU (processor cores). Rather DMA data transfers are facilitated, in part, by the IOMMU and PCIe RPs. However, to perform some IOV operations it is necessary to provide a descriptor that is used to identify a location in memory at which data is to be accessed (written and/or read).

As shown in system 200a of FIG. 2a, this involves a first descriptor fetch comprising reading a descriptor associated with a guest VM 116 in host memory 114 into smart controller local memory 108, and a second descriptor fetch from smart controller local memory 108 to memory on NIC 110. Following the descriptor fetches, two data fetches are performed using a similar access pattern. First the smart controller using the descriptor it has fetched to copy data from host memory 114 to smart controller local memory 108, followed by a second data fetch to write the data into memory on NIC 110.

Figure 2B:
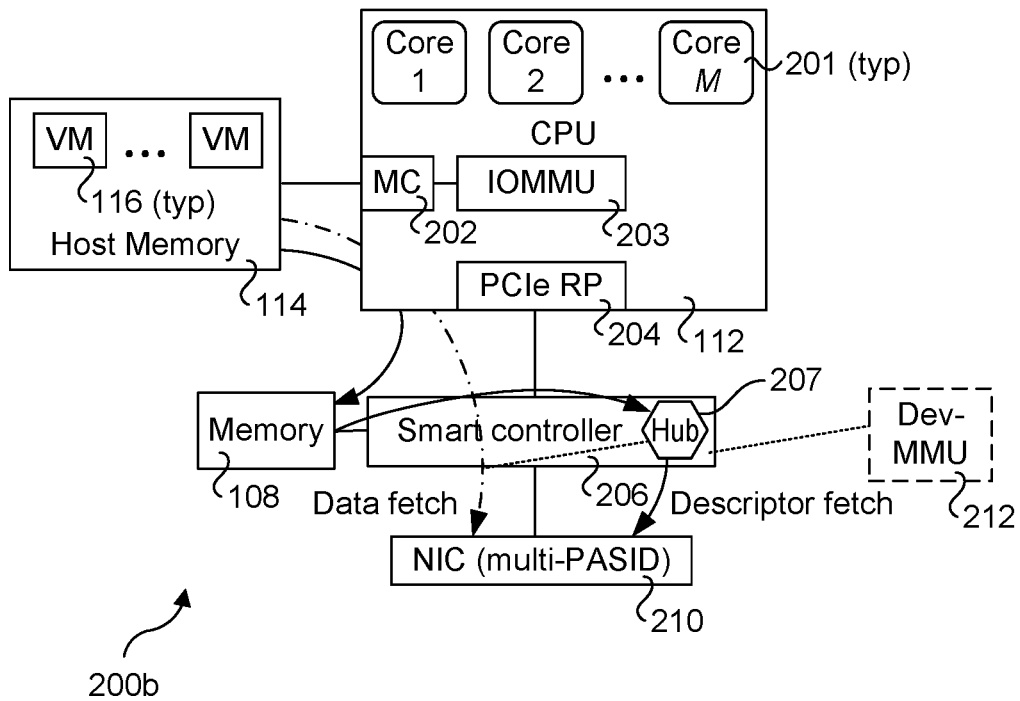
FIG. 2b is a schematic diagram illustrating a memory access scheme using a hub in the smart controller, according to one embodiment.
Figure 3:
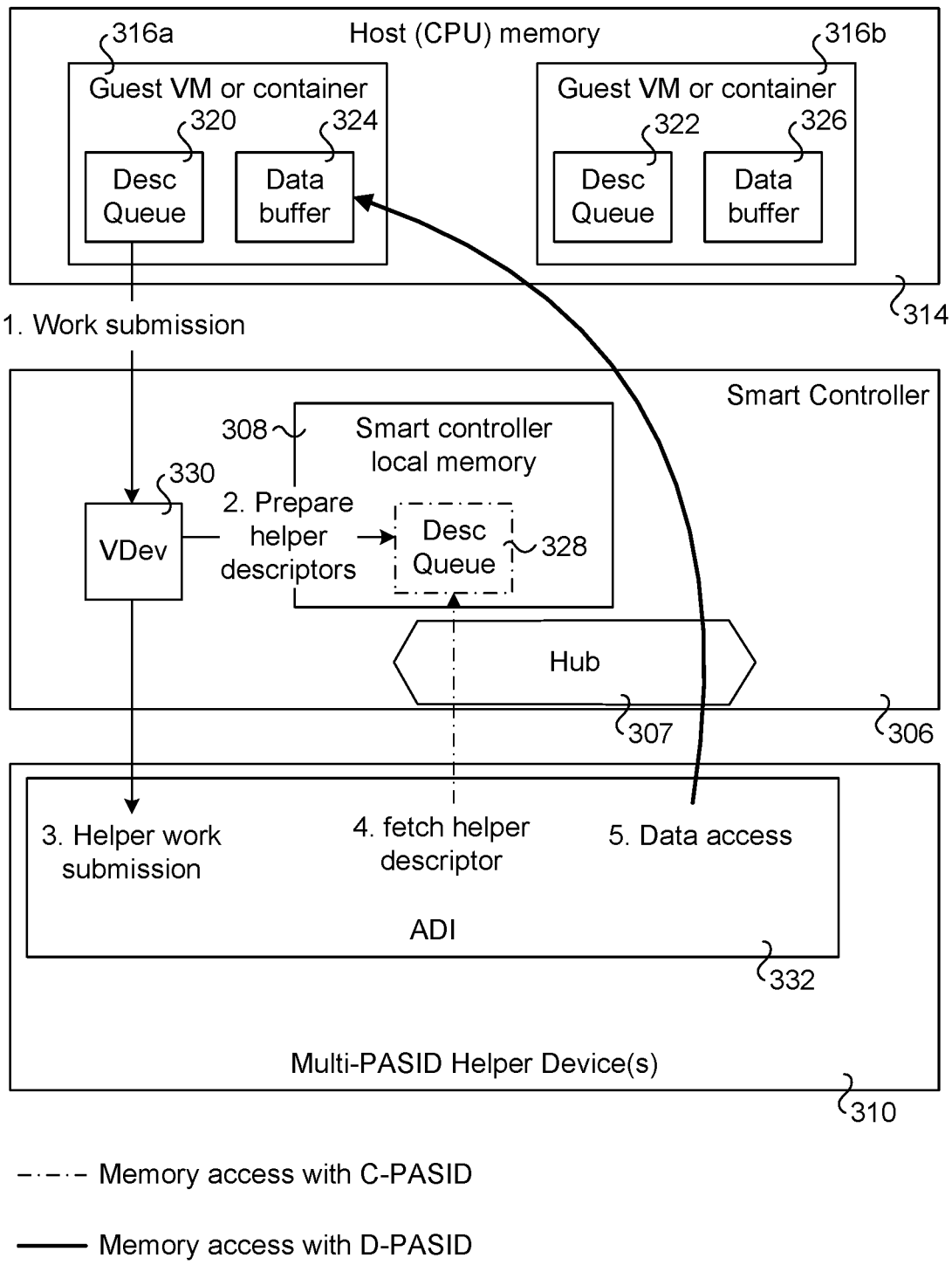
FIG. 3 is a schematic diagram of a system including a smart controller with a hub coupled to a multi-PASID helper device, further illustrating a memory access pattern using the hub, according to one embodiment

FIGS. 2b and 3 show aspects of embodiments that address the foregoing problem by employing two PASIDs per ADI, including a C-PASID that is used for descriptor fetches and a D-PASID that is used for data fetches. As shown in a system 200b in FIG. 2b, a smart controller 206 includes a hub 207 and a multi-PASID NIC 210, with the other components being similar to those shown in system 200a in FIG. 2.

FIG. 3 shows a system 300 including Host memory 314, a smart controller 306, and a multi-PASID helper device 310. Host memory 314 includes a pair of guest VMs or containers 316a and 316b, with descriptor queues 320 and 322 and data buffers 324 and 326. Smart controller 306 is depicted with local smart controller local memory 308 in which a descriptor queue 328 is stored and a VDev 330. Multi-PASID helper device 310 includes an ADI 332.

As depicted by numbered operations 1.-5., the pattern for accessing data under system 300 is as follows. First (1), guest VM 316 prepares descriptor in descriptor queue 320 and submits it to virtual device (VDev) 330 in smart controller 306. Second (2), smart controller 306 fetches the descriptor and prepares the corresponding descriptors for the helper device, as depicted by descriptor queue 328 in smart controller local memory 328. In a third operation (3), VDev 330 submits the work submission to multi-PASID helper device 310. The helper device then fetches the descriptor from descriptor queue 328 using the C-PASID during the fourth operation (4). Memory accesses with the C-PASID are decoded by the "hub" (see description below) and routed to the smart controller's local memory. The data access process is completed in a fifth operation (5) during which multi-PASID helper device 310 uses the D-PASID to read/write data to data buffer 324. The "hub" decodes the D-PASID and routes it up to the CPU. Under a PCIe DMA transaction, the data access would be forwarded from the PCIe RP to the IOMMU, which would access the data in data buffer 324 using the memory controller.

A similar access pattern is illustrated in system 200b of FIG. 2b. This system view includes use of hub 207, which is used to decode the C-PASID to access the smart controller's local memory 108 and to decode the D-PASID to access host memory 114.

As further shown in FIGS. 2a and 2b, smart controllers 106 and 206 may include a device memory management unit (Dev-MMU) 212. A descriptor access using a C-PASID may go through the Dev-MMU. The Dev-MMU is used to perform address translation operations and other operations to facilitate memory access of memory 108 and IO devices attached to a smart controller, such as NICs 110 and 210.

Accelerator Chaining

The smart controller with multi-PASID helper devices may be used to build a virtual device that is composed of a combination of multiple helper devices, for example a virtual storage device with inline compression. The implementation may use two separate salve devices, such as (a) a compression accelerator; and (b) an SSD. The smart controller could sequence every block write command from host via the compression accelerator first and then to the SSD. Similarly, the smart controller could sequence every block read command from host via the SSD and then de-compression accelerator. The accelerator chaining can be enabled transparent to the host.

Hub Example

Figure 4:
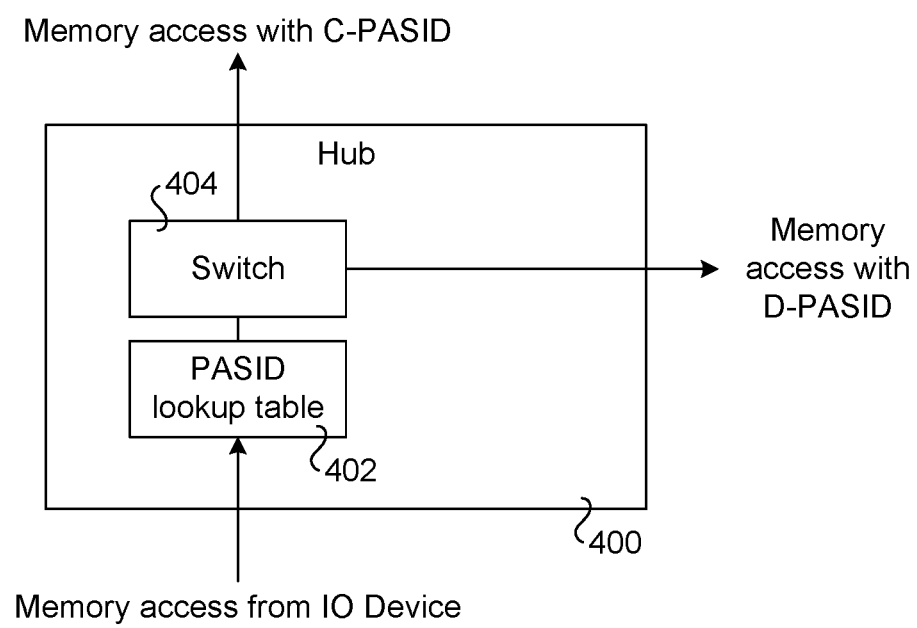
FIG. 4 is a block diagram of a hub, according to one embodiment.

FIG. 4 shows an architecture for a hub 400, according to one embodiment. The hub provides two functionalities: (a) a PASID lookup table 402 that identifies each PASID as a C-PASID or a D-PASID, and (b) a switch 404 that routes C-PASIDs to the CPU (and/or host memory) and D-PASIDs to smart controller or accelerator (and/or local memory for the smart controller or accelerator). Generally, a hub such as hub 400 could be implemented within a smart controller or could also be a discrete component on a platform (as shown in accelerator IO example below).

An advantage of using a hub is it provides a high-performance direct path for memory flows that use D-PASIDs Note that scalable IOV supports PASID virtualization such that the device uses PASIDs from a Global PASID space managed by the host/VMMs IOMMU driver. Therefore, it is possible to perform routing decisions based on PASIDs generated by the device.

The guest driver requests the virtual IOMMU in the guest VM to allocate a PASID, which in turn calls into the host IOMMU's global PASID allocator to get a PASID #. Maintaining a global PASID pool adds a cost, but it is an infrequent operation performed once when an ADI is initialized.

PASID lookup table 402 is used to map C-PASIDs and D-PASIDs to associated data buffers. While it is possible to build a full lookup table, which for a 20-bit (20b) PASID space would require 1 million entries, this would be prohibitively expensive. Rather, in one embodiment the lookup table is simplified by modifying the IOMMU's PASID allocator to contiguously divide the PASID space in 2 pools (one for C-PASIDs and the other for D-PASIDs) using the MSB bit[20]. With this, PASID lookup table 402 in hub 400 could decode PASID bit[20], which is a much simpler implementation in hardware.

As shown in FIG. 4, a memory access from an IO device using hub 400 begins with a lookup of PASID lookup table 402 using the address of the buffer to be accessed by the IO device. The result will either be a C-PASID or D-PASID. Switch 404 is used to forward the access to either memory that is accessed with a C-PASID (such as a VM buffer), or memory that is accessed with a D-PASID.

Accelerator IO Usage

Imagine a system with two devices, an accelerator with local memory and a standard off-the-shelf scalable IOV NIC. Unlike the previous usage, here both these devices are enumerated and managed by the host. The two devices have a direct high-performance data path, such that NIC can directly read/write to accelerator memory (avoiding a trip to the CPU).

Figure 5A:
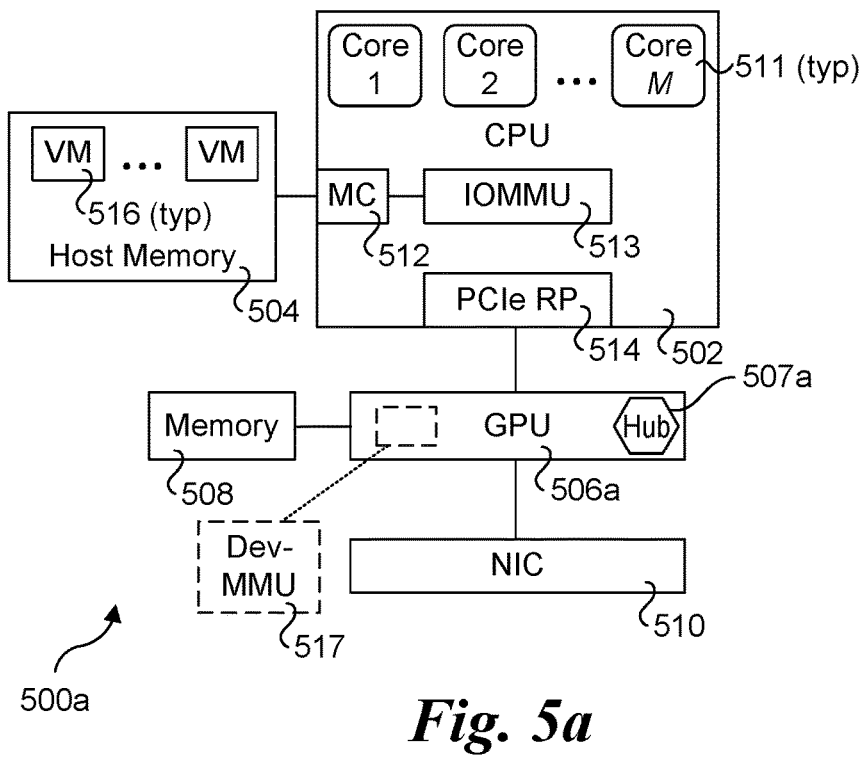
FIG. 5a is a schematic diagram of a system including an accelerator comprising a GPU with a hub disposed in-line between a CPU and a NIC, according to one embodiment.
Figure 5B:
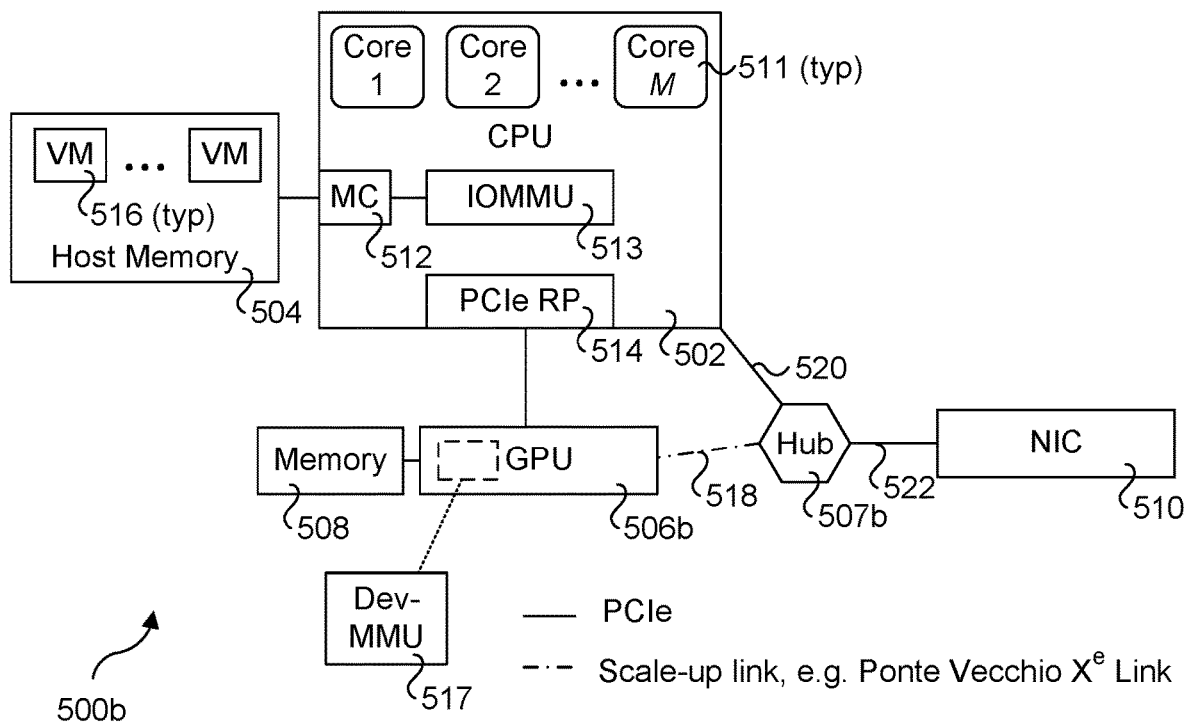
FIG. 5b is a schematic diagram of a system illustrating an alternative configuration to that shown in FIG. 5a under which the hub is a discrete component, according to one embodiment.

FIGS. 5a and 5b shows examples of accelerator IO systems with a GPU (Graphics Processor Unit) as an accelerator and NIC. System 500a in FIG. 5a includes a CPU 502 coupled to host memory 504, a GPU 506a including a hub 507a coupled to GPU memory 508, and a NIC 510. GPU 506a is coupled directly to both CPU 502 and NIC 510. CPU 502 includes M cores 511, an MC 512, an IOMMU 513, and a PCIe RP 514, while multiple guest VMs 516 or containers are deployed in host memory 504. GPU 506a may further include a Dev-MMU 517 in some embodiments. As can be observed by comparing system 500a with system 200a in FIG. 2a, the two systems have similar architectures, with a smart controller with a hub in-line between a CPU and NIC in system 200a and an accelerator comprising a GPU with a hub in-line between a CPU and NIC in system 500a.

In system 500b in FIG. 5b, NIC 510 and a GPU 506b are both attached to CPU 502 as peers. In this embodiment, a hub 507b is a discrete component that is coupled to GPU 506b via a high-speed scale-up link 518, such as the Intel® Ponte Vecchio $X^e$ Link. In the illustrated embodiment, hub 507b is connected to CPU 502 and NIC 510 via respective PCIe links 520 and 522. Other types of IO links may also be used in a similar manner.

Under the basic flow for system 500a and 500b, software wants to setup, e.g., a Remote DMA (RDMA) capable NIC to read or write from GPU memory 508. To do so, software allocates memory from GPU memory 508, prepares descriptors and submits them to NIC 510. NIC 510 fetches the descriptor from host memory 514 and writes/reads data to GPU memory 508, preferably using the high-speed path (not going via the CPU).

Figure 5C:
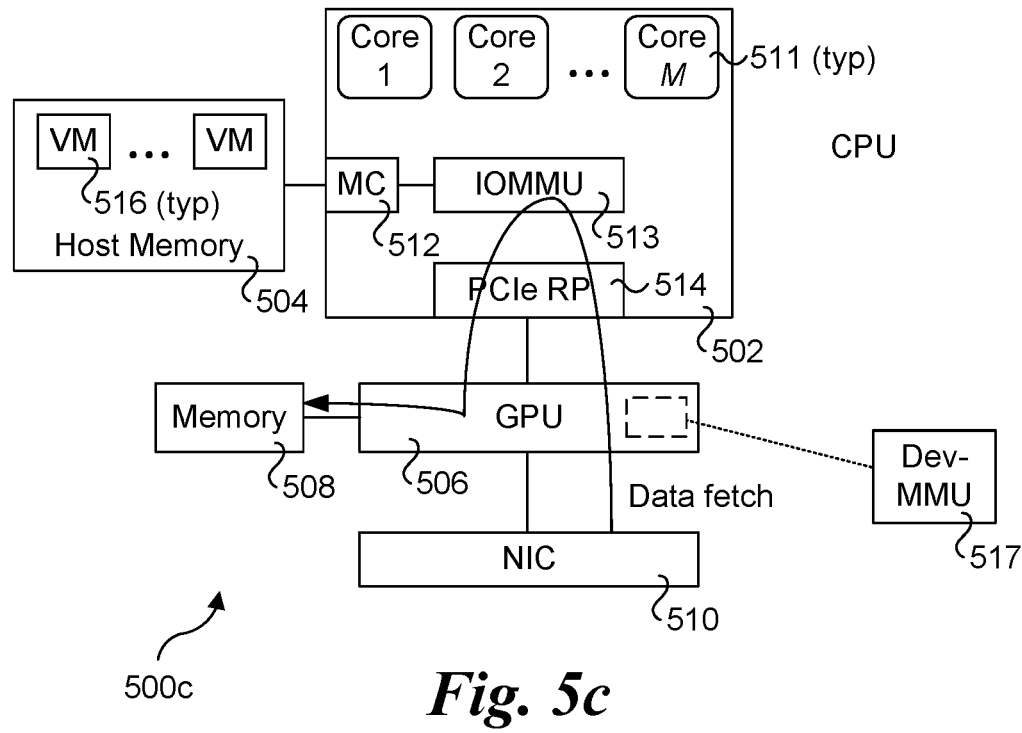
FIG. 5c is a schematic diagram of a system including a GPU disposed in-line between a CPU and a NIC, further illustrating a data fetch from the NIC to memory attached to the GPU that goes through the CPU.

When virtualized, the GPU and NIC ADIs are mapped to a guest VM. The descriptors are submitted with Guest Physical Addresses (GPA) or Guest IO Virtual Addresses (G-IOVA). For a NIC with a single PASID per ADI, all memory accesses will have to be routed to the CPU's IOMMU for address translation (from GPA/G-IOVA to HPA) and if it decodes to the GPU's memory range, the flow will be routed back to GPU. An example of this flow is illustrated in system 500c in FIG. 5c, which is similar to system 500a except GPU 506 does not have a hub 507. As shown, this costs a trip to the CPU for IO flows that are targeted to GPU memory. This significantly impacts bandwidth and latency for accelerator IO flows.

Figure 5D:
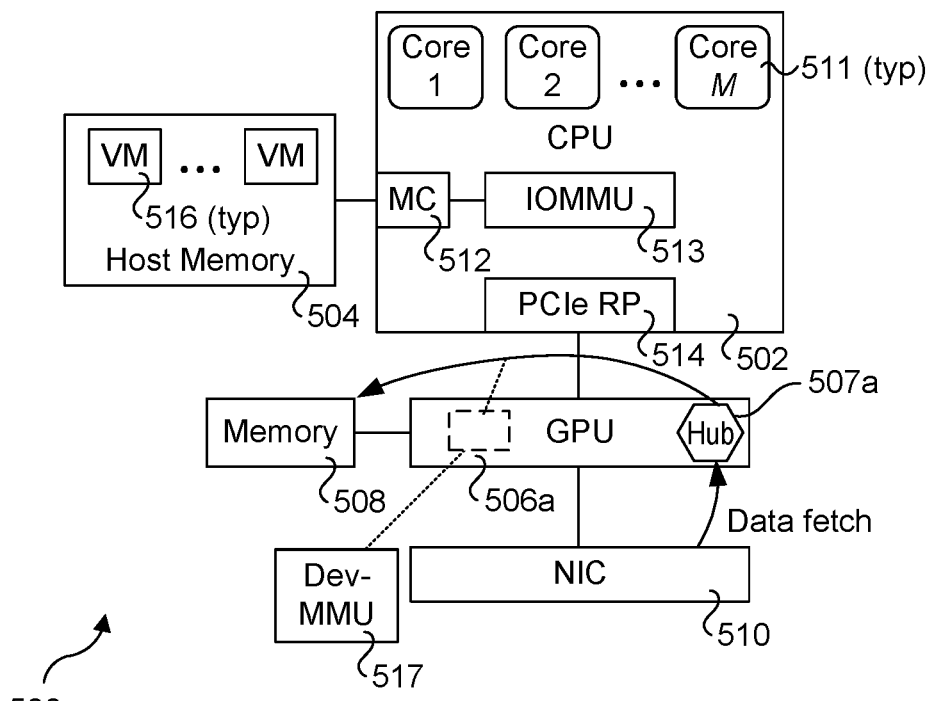

In system 200b, a similar problem is addressed by designing a scalable IOV device (e.g., NIC or SSD) with two PASIDs per ADI, a C-PASID that will be used for descriptor fetches and D-PASID that will be used for data fetches. Key differences with respect to the embodiment of system 500a of FIGS. 5a to 5d is that (a) the IO device is visible to the host, and (b) descriptor fetches are from CPU memory while data fetches are from accelerator memory. As shown in FIG. 5d, NIC 510 access GPU memory 508 via hub 507a and Dev-MMU 517 rather than having to go through IOMMU 512.

Figure 6A:
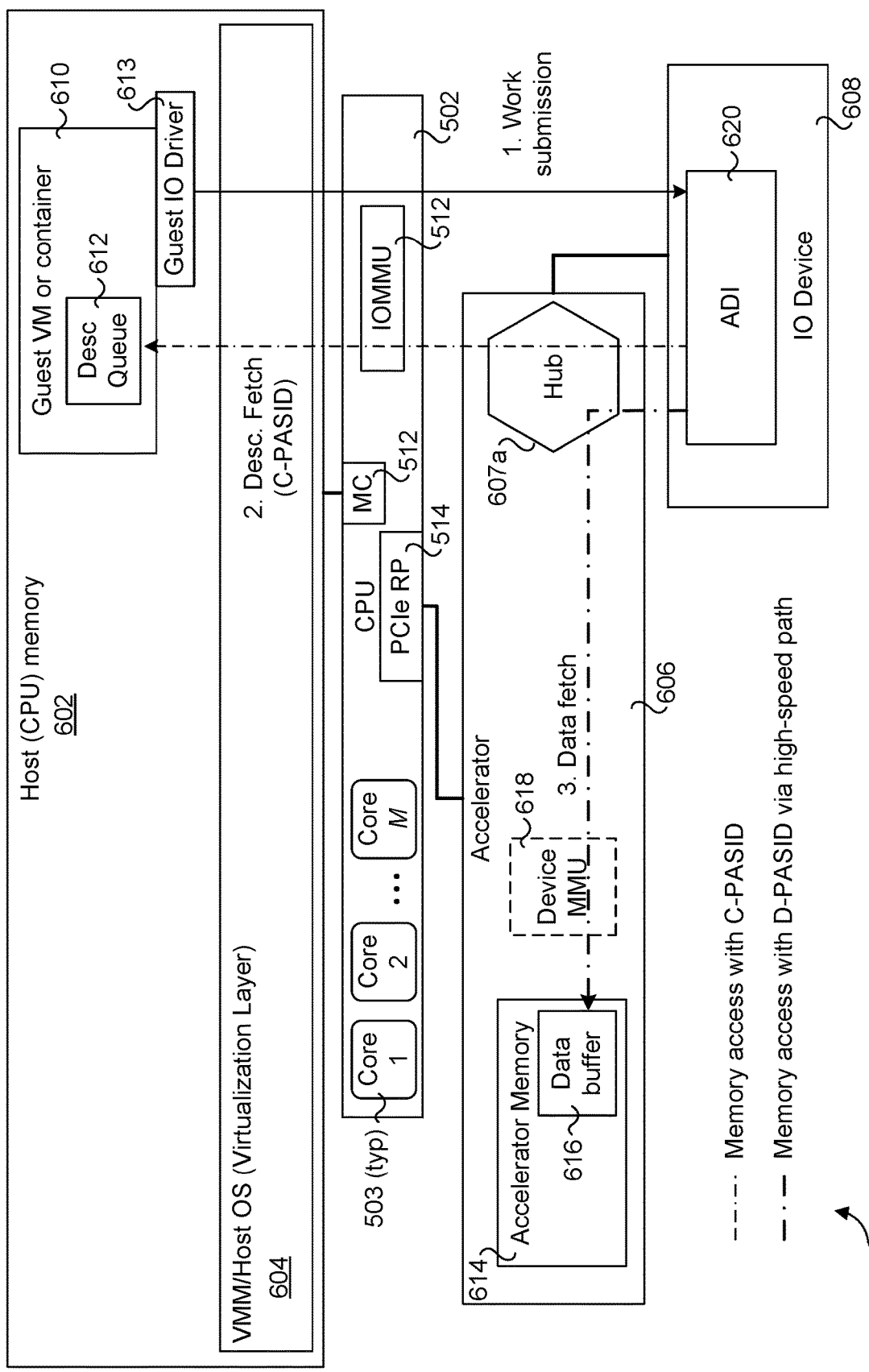
FIG. 6a is a schematic diagram illustrating further details of the embodiment of FIG. 5a including data flows in connection with processing a work submission under which a IOV device is to access memory on an accelerator.

FIG. 6a shows a diagram 600a illustrating the high-level operation of accelerator IO when using a multi-PASID IO device, according to one embodiment. The top-level components include host memory 602, VMM/Host operating system (OS) 604, a CPU 502, an accelerator 606, and an IO device 608. A guest VM or container 610 including a descriptor queue 612 is deployed in host memory 602. Guest VM or container 610 employs a guest IO driver 613 to access IO device 608. VMM/Host OS 604, which also reside in host memory 602, are used to implement a virtualization layer between software, such as guest VMs and containers, and system hardware, such as accelerator 606 and IO device 608. In the illustrated embodiment, a VMM comprising a Type-2 hypervisor is run as an application on an operating system. A virtualization layer may also be implemented using a Type-1 hypervisor architecture (also referred to as a bare metal hypervisor), wherein the hypervisor runs on the system hardware without an operating system. For container-based deployments, VMM/Host OS 604 would be replaced with a container virtualization layer, such as implemented in Docker® container environments.

The software components depicted in host memory 602 are executed on one or more of the M cores 503 on CPU 502. IOMMU 512 is programmed with applicable address mapping information to route memory access requests via PCIe DMA transactions to memory addresses in host memory 602.

Accelerator 606 includes local accelerator memory 614 containing a data buffer 616 and a Dev-MMU 618 and an integrated hub 607a. IO device 608 includes an ADI 620 that stores accelerator and IO device ADIs that are assigned to guest VM 610. Guest IO driver 613 requests two PASIDs: a C-PASID and a D-PASID.

Guest VM 610 accesses data buffer 616 using the following flow. During a first operation (1), Guest IO driver prepares a descriptor and submit it to IO device 608 via ADI 620. In a second operation (2), IO Device 608 fetches the descriptor from descriptor queue 612 using a C-PASID from ADI 620. Because it is using the C-PASID, hub 607a will route the memory accesses to the CPU.

In a third operation (3), IO device 608 accesses data in data buffer 616 using a D-PASID from ADI 620. Hub 607a routes the D-PASID to accelerator 614 via a high-speed path. If the accelerator memory 614 is virtualized, then the accesses may be translated by Dev-MMU 618. For example, when a GPU is the accelerator a local memory translation table or similar may be walked by a graphics MMU in the GPU.

Figure 6B:
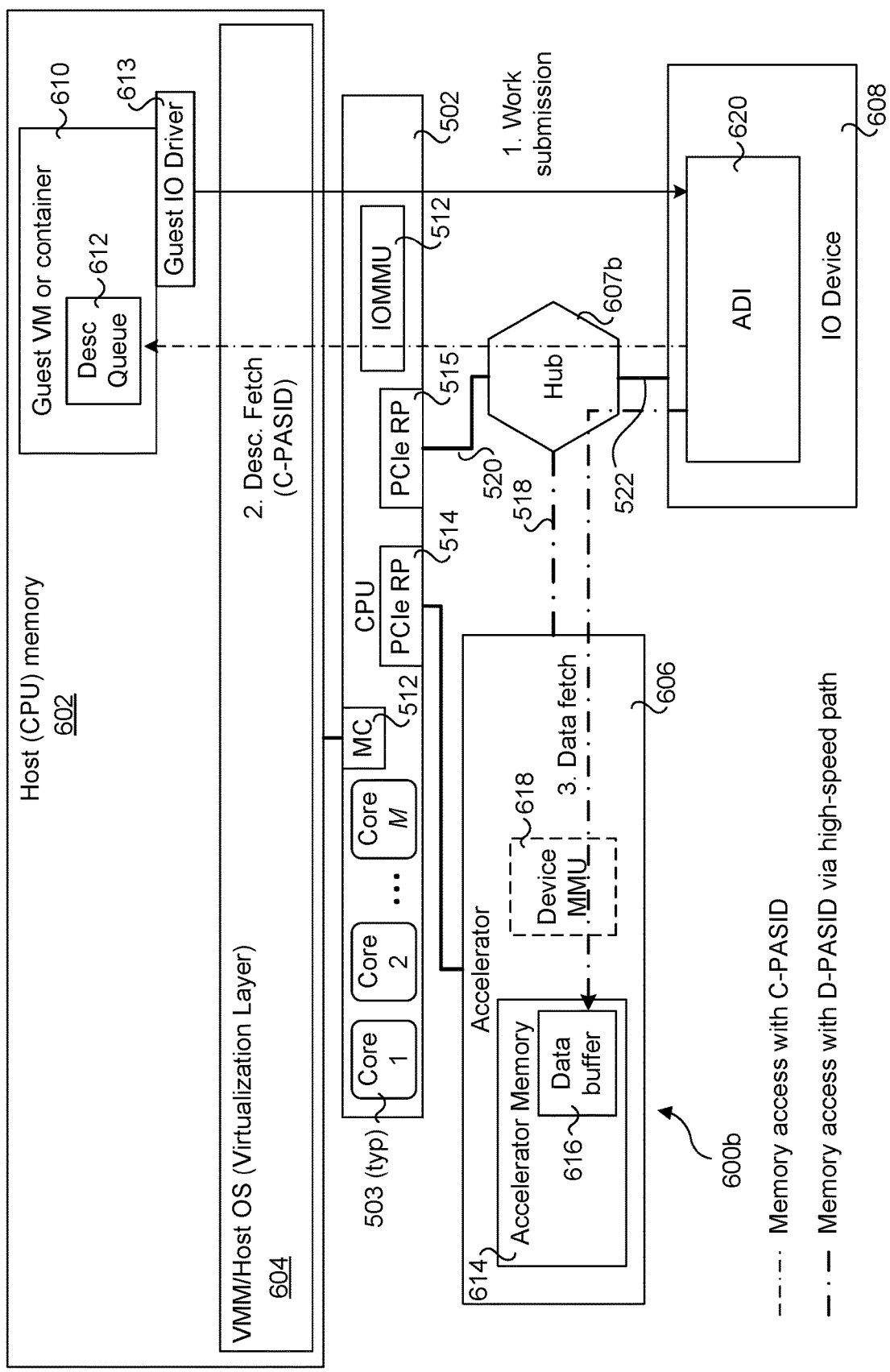
FIG. 6b is a schematic diagram illustrating further details of the embodiment of FIG. 5b including data flows in connection with processing a work submission under which a IOV device is to access memory on an accelerator.

FIG. 6b shows a diagram 600b illustrating an alternative configuration to that shown in FIG. 6a under which a discrete hub 607b is used. Hub 607b is connected to CPU 502 via a PCIe RP 515 and a PCI link 520 and to IO device 608 via a PCIe link 522. Hub 607b is also connected to accelerator 606 via a high-speed data link 518. Generally, the data access pattern in connection with the work submission is similar in the embodiments of FIGS. 6a and 6b, with hub 607b using the C-PASID and D-PASID to forward memory access requests and/or fetches to CPU 502 or accelerator 606.

Generally, accelerator 606 is illustrative of various types of devices that may be used for performing accelerators operations. Such accelerators include but are not limited to GPUs, Field Programmable Gate Array (FPGAs), and other types off-load devices including embedded circuitry and/or embedded processors for off-loading CPU workloads.

Computer System

Figure 7:
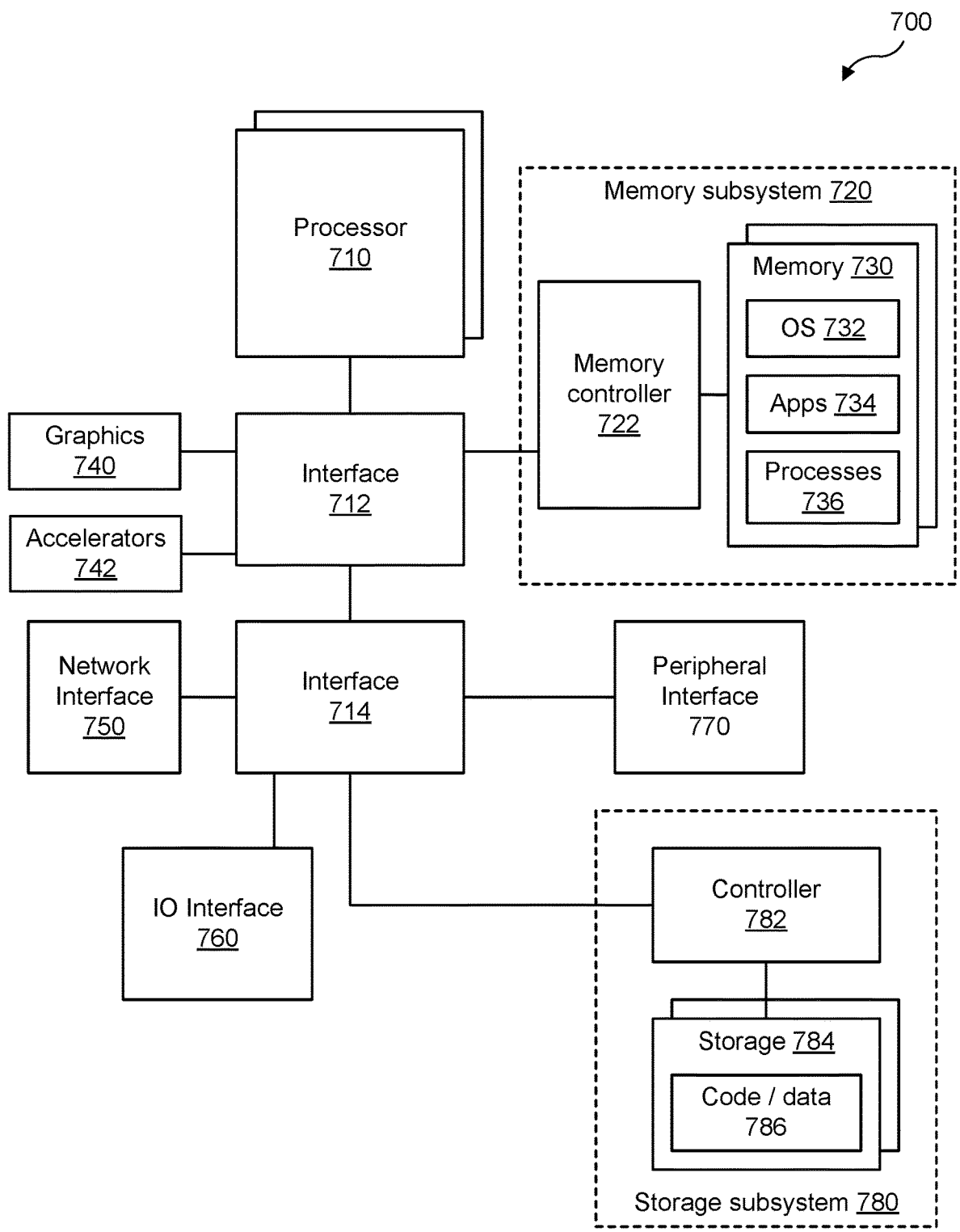
FIG. 7 is a diagram of a system that may be implemented with aspects of the embodiments described and illustrated herein.

FIG. 7 depicts a system 700 in which aspects of some embodiments disclosed above may be implemented. System 700 includes one or more processors 710, which provides processing, operation management, and execution of instructions for system 700. Processor 710 can include any type of microprocessor, central processing unit (CPU), graphics processing unit (GPU), processing core, multi-core processor or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or optional graphics interface components 740, or optional accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (10) interface(s) 760. IO interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

While the foregoing examples illustrated the use of two PASIDs, additional PASIDs may be also used. Generally, each PASID will be associated with a respective address space and memory device (or memory on-board a device). As described above, the use of PASIDs in combination with steering operations performed by a hub enables memory access using DMA. It is further noted that the use of the nomenclature C-PASID and D-PASID is for illustrative purposes and is non-limiting. More generally, a C-PASID and D-PASID are illustrative of two PASIDs.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a system including a Central Processing Unit (CPU) operatively coupled to an Input/Output Virtualization (IOV) device via an in-line device, comprising:
   implementing a plurality of Process Address Space Identifiers (PASIDs) associated with respective memory spaces on the IOV device;
   using a first PASID to fetch a descriptor in a first memory space; and
   using a second PASID to fetch data in a second memory space,
   wherein the IOV device includes an Assignable Device Interface (ADI) implementing the first PASID and the second PASID.

2. The method of claim 1, further comprising:
   implementing a Control Process Address Space Identifier (C-PASID) in the ADI for the IOV device, the C-PASID associated with the first memory space; and
   implementing a Data PASID (D-PASID) in the ADI for the IOV device, the D-PASID associated with the second memory space,
   using the C-PASID to fetch a descriptor in the first memory space; and
   using the D-PASID to fetch data in the second memory space.

3. The method of claim 1, wherein the CPU is a host CPU that is coupled to host memory comprising the first memory space in which descriptors are stored and the second memory space in which data are stored.

4. The method of claim 3, wherein the in-line device comprises smart controller coupled to the CPU and coupled to one or more IO devices including the IOV device.

5. The method of claim 4, wherein the IOV device is a helper device further comprising:
   implementing a helper descriptor queue on the smart controller;
   using a Control Process Address Space Identifier (C-PASID) to fetch a helper descriptor from the helper descriptor queue; and
   using the helper descriptor to access a data buffer in the host memory.

6. The method of claim 1, further comprising:
   implementing a hub in the in-line device or coupled between the in-line device and the IOV device; and
   using the hub to steer memory access requests from the IOV device to the first memory space using a Control Process Address Space Identifier (C-PASID) and to the second memory space using a Data PASID (D-PASID).

7. The method of claim 6, wherein the hub performs operations comprising:
   receiving a memory access request from the IOV device;
   performing a PASID lookup to steer a C-PASID or a D-PASID associated with the memory access request;
   for a C-PASID, forwarding the memory request to first device via which a memory space associated with the C-PASID can be accessed; and
   for a D-PASID, forwarding the memory request to a second device via which a memory space associated with the D-PASID can be accessed.

8. The method of claim 1, wherein the in-line device comprises an accelerator coupled to the CPU and operatively coupled to the IOV device.

9. The method of claim 8 wherein the CPU is a host CPU that is coupled to host memory comprising the first memory space in which descriptors are stored, and wherein the accelerator stores data in a local memory including the second memory space that is embedded in the accelerator or coupled to the accelerator, further comprising:
   fetching, using a first PASID, a descriptor from the host memory; and
   fetching, using a second PASID, data stored in the local memory of the accelerator.

10. The method of claim 9, wherein a guest virtual machine (VM) is hosted by the host CPU and resides in the host memory including a descriptor queue, and wherein a data buffer is stored in the local memory of the accelerator, further comprising:
    submitting a work request referencing a descriptor in the descriptor queue from a guest IO driver to the IOV device;
    fetching, via the IOV device, the descriptor from the descriptor queue; and
    using the descriptor to enable the IOV device to access data in the data buffer.

11. A system, comprising:
    a host central processing unit (CPU) having a plurality of cores and a memory controller;
    host memory, coupled to the memory controller on the host CPU;
    a smart controller, coupled to the CPU and having local memory embedded thereon or coupled to local memory;
    a helper device, coupled to the smart controller and -implementing a first Process Address Space Identifier (PASID) associated with a first memory space and a second PASID associated with a second memory space in which data are stored;
    wherein the system is configured to,
       use the first PASID to fetch a descriptor in the first memory space; and
       use the second PASID to fetch data in the second memory space,
    wherein the helper device includes an Assignable Device Interface (ADI) implementing the first PASID and the second PASID.

12. The system of claim 11, wherein the first PASID comprising a Control PASID (C-PASID) and the second PASID comprises a Data PASID (D-PASID) further comprising:
    a hub, embedded on the smart controller, configured to steer memory access requests from the helper device to the first memory space using the C-PASID and to the second memory space using the D-PASID.

13. The system of claim 12, wherein the CPU includes an input-output memory management unit (IOMMU), the smart controller includes a device memory management unit (Dev-MMU), and wherein the hub is configured to:
  receive a memory access request from the helper device;
  perform a PASID lookup to steer a C-PASID or a D-PASID associated with the memory access request;
  for a C-PASID, forward the memory request to the smart controller local memory via the Dev-MMU; and
  for a D-PASID, forward the memory request to the host memory via IOMMU.

14. The system of claim 11, wherein the smart controller further includes a descriptor queue in the local memory, and wherein the first memory space comprises the descriptor queue in the local memory.

15. The system of claim 14, wherein the system is further configured to:
  implement a guest virtual machine (VM) or container in the host memory;
  implement a descriptor queue in the host memory;
  submit a work submission from the guest VM or container to the smart controller, the work submission including one or more descriptors from the descriptor queue; and
  prepare helper descriptors corresponding to the one or more descriptors and store the helper descriptors in the descriptor queue in the local memory.

16. A system, comprising:
  a host central processing unit (CPU) having a plurality of cores, a memory controller, and an input-output memory management unit (IOMMU);
  host memory, coupled to the memory controller on the host CPU;
  an accelerator, coupled to the CPU and having local memory embedded thereon or coupled to local memory;
  an Input/Output Virtualization (IOV) device, operatively coupled to the accelerator and the host CPU and including an Assignable Device Interface (ADI) implementing a Control Process Address Space Identifier (C-PASID) associated with a first memory space in the host memory and a Data PASID (D-PASID) associated with a second memory space in the local memory of the accelerator;
  wherein the system is configured to,
    use the C-PASID to fetch a descriptor in the first memory space; and
    use the D-PASID to fetch data in the second memory space.

17. The system of claim 16, further comprising a hub coupled to the host CPU, IOV device, and accelerator via respective links or embedded on the accelerator, configured to steer memory access requests from the IOV device to the first memory space using a C-PASID and to the second memory space using a D-PASID.

18. The system of claim 17, wherein the CPU includes an input-output memory management unit (IOMMU), the accelerator includes a device memory management unit (Dev-MMU), and wherein the hub is configured to:
  receive a memory access request from the IOV device;
  perform a PASID lookup to steer a C-PASID or a D-PASID associated with the memory access request;
  for a C-PASID, forward the memory request to host memory via the IOMMU; and
  for a D-PASID, forward the memory request to the accelerator local memory via the Dev-MMU.

19. The system of claim 16, wherein the accelerator comprises a graphics processing unit (GPU) or a Field Programmable Gate Array (FPGA).

20. The system of claim 16, wherein the accelerator further comprises a device memory management unit (Dev-MMU) and memory addresses in the descriptors are virtual addresses, and wherein the accelerator is configured to:
  receive a memory access request including a virtual address; and
  translate the memory access request using the Dev-MMU to access the local memory.

21. The system of claim 16, wherein the system includes a guest virtual machine or container hosted in by the CPU and deployed in the host memory, and wherein the system is further configured to:
  issue a work submission from the guest VM or container to the IOV device identifying a work descriptor in a descriptor queue in host memory;
  use a C-PASID to fetch the work descriptor from the descriptor queue; and
  use a D-PASID to fetch data from a data buffer in the accelerator local memory identified by the work descriptor that is fetched.

* * * * *